(12) United States Patent
Boesch

(10) Patent No.: US 10,855,105 B2
(45) Date of Patent: Dec. 1, 2020

(54) AUTONOMOUS VEHICLE CRITICAL LOAD BACKUP

(71) Applicant: Ford Global Technologies, LLC, Dearborn, MI (US)

(72) Inventor: Mathew A. Boesch, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 189 days.

(21) Appl. No.: 16/028,606

(22) Filed: Jul. 6, 2018

(65) Prior Publication Data

US 2020/0014240 A1  Jan. 9, 2020

(51) Int. Cl.
 *H02J 9/06* (2006.01)
 *B60R 16/033* (2006.01)
 *G05D 1/02* (2020.01)

(52) U.S. Cl.
 CPC ............ *H02J 9/061* (2013.01); *B60R 16/033* (2013.01); *G05D 1/0217* (2013.01)

(58) Field of Classification Search
 CPC .... H02J 9/061; B60R 16/033; B60R 16/0232; H02H 3/046
 USPC .................................... 307/9.1, 10.1, 64, 65
 See application file for complete search history.

(56) References Cited

U.S. PATENT DOCUMENTS

| | | | |
|---|---|---|---|
| 4,723,079 A | 2/1988 | Norton | |
| 7,112,896 B2 * | 9/2006 | Kinnard | H02J 1/10 307/43 |
| 7,956,490 B2 | 6/2011 | Sotnikow et al. | |
| 8,996,284 B2 | 3/2015 | Polimeno et al. | |
| 9,184,582 B2 | 11/2015 | Koch et al. | |
| 9,328,711 B2 | 5/2016 | Uchida | |
| 2002/0109406 A1 * | 8/2002 | Aberle | B60L 58/10 307/10.1 |
| 2004/0046458 A1 * | 3/2004 | MacKay | H02J 9/002 307/80 |
| 2004/0262997 A1 * | 12/2004 | Gull | H02J 3/005 307/64 |
| 2018/0029474 A1 | 2/2018 | Berels et al. | |
| 2019/0334375 A1 * | 10/2019 | Wataru | G01R 31/40 |

* cited by examiner

*Primary Examiner* — Michael R. Fin
(74) *Attorney, Agent, or Firm* — Frank A. MacKenzie; Bejin Bieneman PLC

(57) ABSTRACT

A vehicle power management system includes a backup battery and an isolation circuit. The isolation circuit has a switch in parallel with a diode. The isolation circuit is electrically connected to the backup battery. The isolation circuit electrically isolates the backup battery from a non-critical load when the switch is open.

15 Claims, 3 Drawing Sheets

AUTONOMOUS VEHICLE CRITICAL LOAD BACKUP

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
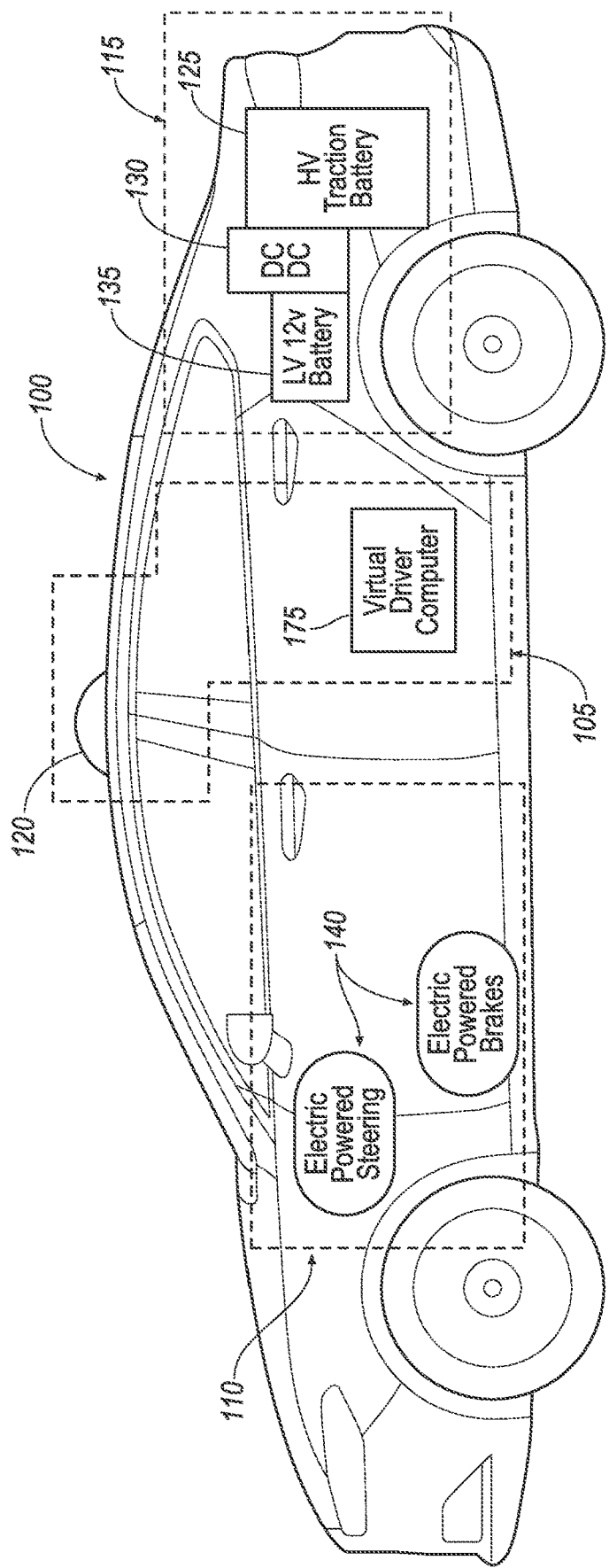
FIG. 1 illustrates an example vehicle with a power management system.

Certain systems require continuous power, especially when no manually powered backup system is available. Examples of systems needing continuous power include life support systems, medical systems, aircraft control systems, certain vehicle control systems, and various alarm systems such as fire, smoke, and noxious gas detection systems. In the automotive context, an autonomous vehicle, while in motion, benefits from continuously powering the steering and braking actuators since a driver may not be available to manually operate the steering wheel and brakes.

Continuous power supplies are designed to be robust to various types of faults. Adding redundancy, which could include using two or more isolated power supply busses, is one way to improve robustness. Backup energy storage systems, such as backup batteries, can provide redundancy to main generators or energy storage systems for a period of time dictated by the installed storage capacity and the actual loads applied. When critical controls (sometimes referred to as "system critical loads") share stored power with non-critical loads and the energy storage system is unable to fully power both the critical and non-critical loads, shedding the non-critical loads can make more power available to the system critical loads for a longer period of time. Shedding loads can involve sending a network shed request to the non-critical loads commanding the non-critical load to deactivate. Alternatively or in addition, the non-critical load can be disconnected from the energy storage system by, e.g., opening a relay if the non-critical load does not or cannot execute a shed request. Another issue arises when the critical loads, non-critical loads, and backup battery are arranged in parallel in a circuit. In that instance, certain failures of the non-critical load can cause the backup battery to short to ground, taking electrical energy away from the critical loads.

An example vehicle power management system that prevents the failure of non-critical loads from diverting power away from critical loads includes a backup battery and an isolation circuit. The isolation circuit has a switch in parallel with a diode. The isolation circuit is electrically connected to the backup battery. The isolation circuit electrically isolates the backup battery from a non-critical load when the switch is open.

In the vehicle power management system, an anode of the first diode is electrically connected to the first non-critical load and a cathode of the first diode is electrically connected to the first backup battery. The vehicle power management system may include a second backup battery and a second isolation circuit. The second isolation circuit may have a second switch in parallel with a second diode to electrically isolate the second backup battery from a second non-critical load. The second isolation circuit may be electrically connected to the second backup battery to electrically isolate the second backup battery from a second non-critical load when the second switch is open. The vehicle power management system may further include a first voltage converter electrically connected to the first non-critical load, the first isolation circuit, and the first backup battery. The vehicle power management system may further include a second voltage converter electrically connected to the second non-critical load, the second isolation circuit, and the second backup battery. A high output voltage of the first voltage converter to the first isolation circuit may close the first switch of the first isolation circuit. A high output voltage of the second voltage converter to the second isolation circuit may close the second switch of the second isolation circuit. A reduction of voltage at a circuit junction between the first voltage converter and the first isolation circuit may open the first switch of the first isolation circuit. A reduction of voltage at a circuit junction between the second voltage converter and the second isolation circuit may open the second switch of the second isolation circuit.

The first voltage converter may be electrically connected to the second isolation circuit and the second voltage converter may be electrically connected to the first isolation circuit. In that approach, a high output voltage of the second voltage converter to the first isolation circuit may close the first switch of the first isolation circuit. Further, a high output voltage of the first voltage converter to the second isolation circuit may close the second switch of the second isolation circuit. A reduction of voltage at a circuit junction between the second voltage converter and the first isolation circuit may open the first switch of the first isolation circuit. A reduction of voltage at a circuit junction between the first voltage converter and the second isolation circuit may open the second switch of the second isolation circuit.

The second backup battery may be electrically connected to the first isolation circuit. The first backup battery may be electrically connected to the second isolation circuit.

A high voltage power source may be electrically connected through a voltage converter to the first isolation circuit, the first backup battery, the second isolation circuit, and the second backup battery. The first switch of the first isolation circuit may open as a result of an output voltage of the first backup battery to the first isolation circuit exceeding an output voltage of the voltage converter to the first isolation circuit. The second switch of the second isolation circuit may open as a result of an output voltage of the second backup battery to the second isolation circuit exceeding an output voltage of the voltage converter to the second isolation circuit.

The first switch of the first isolation circuit may be closed while an output voltage of the first backup battery to the first isolation circuit is below an output voltage of the voltage converter to the first isolation circuit. The second switch of the second isolation circuit may be closed while an output voltage of the second backup battery to the second isolation circuit is below an output voltage of the voltage converter to the second isolation circuit.

The vehicle power management system may include a memory and a processor programmed to execute instructions stored in the memory. The instructions may include detecting a short-circuit and outputting a control signal to open at least one of the first switch and the second switch as a result of detecting the short-circuit. Detecting the short-circuit may include detecting a failure of the first non-critical load. Outputting the control signal may include outputting the control signal to open the first switch as a result of detecting the failure of the first non-critical load. Detecting the short-circuit may include detecting a failure of the second non-critical load. Outputting the control signal may include outputting the control signal to open the second switch as a result of detecting the failure of the second non-critical load.

Another implementation of the vehicle power management system may include a first backup battery, a first isolation circuit having a first switch in parallel with a first diode where the first isolation circuit is electrically connected to the first backup battery to electrically isolate the first backup battery from a first non-critical load when the first switch is open, a second backup battery, and a second isolation circuit having a second switch in parallel with a second diode to electrically isolate the second backup battery from a second non-critical load where the second isolation circuit is electrically connected to the second backup battery to electrically isolate the second backup battery from a second non-critical load when the second switch is open. The vehicle power management system may further include a first voltage converter electrically connected to the first non-critical load, the first isolation circuit, the first backup battery, the second non-critical load, the second isolation circuit, and the second backup battery. A second voltage converter may be electrically connected to the first non-critical load, the first isolation circuit, the first backup battery, the second non-critical load, the second isolation circuit, and the second backup battery. The vehicle power management system may further include a memory and a processor programmed to execute instructions stored in the memory. The instructions may include detecting a short-circuit and outputting a control signal to open at least one of the first switch and the second switch as a result of detecting the short-circuit.

A reduction of voltage at a circuit junction between the first voltage converter and the first isolation circuit may open the first switch of the first isolation circuit. A reduction of voltage at a circuit junction between the second voltage converter and the second isolation circuit may open the second switch of the second isolation circuit.

A reduction of voltage at a circuit junction between the second voltage converter and the first isolation circuit may open the first switch of the first isolation circuit. A reduction of voltage at a circuit junction between the first voltage converter and the second isolation circuit may open the second switch of the second isolation circuit.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the autonomous host vehicle 100 includes a virtual driver system 105, an automated vehicle platform ("AVP") 110, and a power management system 115. At least some parts of the virtual driver system 105, the power management system 115, or both, may be implemented by a vehicle computer.

The virtual driver system 105 is a computing platform, implemented via sensors 120, controllers, circuits, chips, and other electronic components, that control various autonomous operations of the host vehicle 100. The virtual driver system 105 includes an autonomous vehicle controller programmed to process the data captured by the sensors 120, which may include a lidar sensor, a radar sensor, a camera, ultrasonic sensors, etc. The autonomous vehicle controller is programmed to output control signals to components of the automated vehicle platform 110 to autonomously control the host vehicle 100 according to the data captured by the sensors 120.

The automated vehicle platform 110 refers to the components that carry out the autonomous vehicle operation upon instruction from the virtual driver system 105, and specifically, from the autonomous vehicle controller. As such, the automated vehicle platform 110 includes various actuators incorporated into the host vehicle 100 that control the steering, propulsion, and braking of the host vehicle 100. The automated vehicle platform 110 further includes various platform controllers (sometimes referred to in the art as "modules"), such as a chassis controller, a powertrain controller, a body controller, an electrical controller, etc.

The power management system 115, described in greater detail below, electrically isolates a backup battery from non-critical loads when one or more non-critical loads fails, especially in instances where the failure of the non-critical load would otherwise cause the backup battery to short to ground. Electrically isolating the backup battery from non-critical loads means that the non-critical loads are unable to draw energy from the backup battery. The power management system 115 is described in more detail below with respect to FIG. 2. As shown in FIG. 1, components of the power management system 115 include a high voltage power source 125, voltage converters 130, and low-voltage batteries 135, all of which are described in more detail below with respect to FIG. 2. Example critical loads 140 are also shown in FIG. 1 and described in greater detail below with respect to FIG. 2.

Although illustrated as a sedan, the host vehicle 100 may include any passenger or commercial automobile such as a car, a truck, a sport utility vehicle, a crossover vehicle, a van, a minivan, a taxi, a bus, etc. As discussed above, the host vehicle 100 is an autonomous vehicle that can operate in an autonomous (e.g., driverless) mode (SAE levels 4-5), a partially autonomous mode (e.g., SAE levels 1-3), and/or a non-autonomous mode (e.g., SAE level 0).

Figure 2:
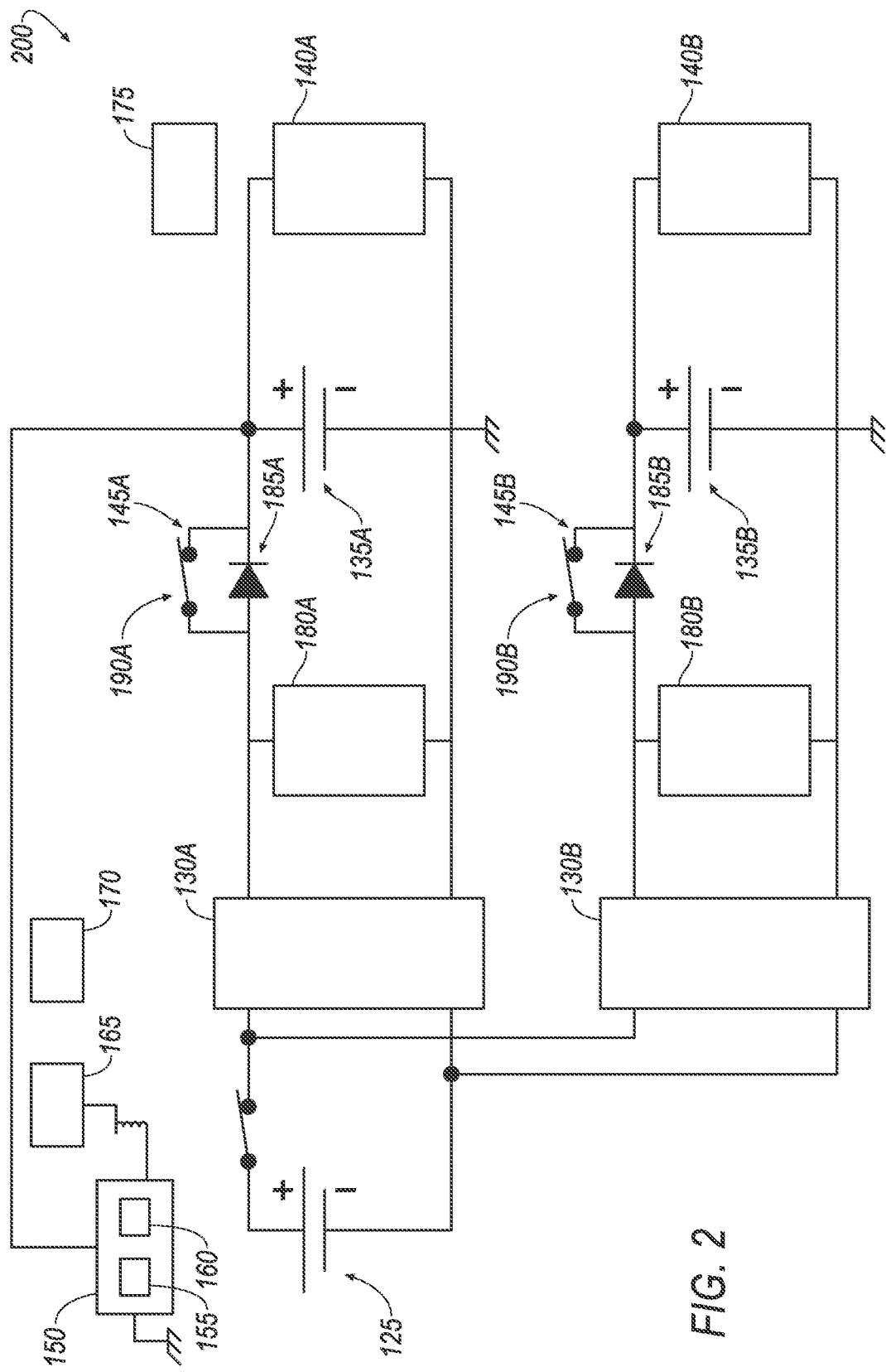
FIG. 2 is a circuit diagram showing example components of the power management system.

Referring now to FIG. 2, a circuit 200 implementing the power management system 115 may include the high voltage power source 125, voltage converters 130 such as a first voltage converter 130A and a second voltage converter 130B, low-voltage batteries 135 including a first backup battery 135A and a second backup battery 135B, a first critical load 140A, a second critical load 140B, a first isolation circuit 145A, a second isolation circuit 145B, and a battery controller 150 having a memory 155 and a processor 160. Other components shown in FIG. 2 include a powertrain controller 165, an engine controller 170, and an AVP interface controller 175. While described as part of the battery controller 150, the memory 155 and processor 160 may be incorporated into one or more of the first voltage converter 130A, the second voltage converter 130B, the powertrain controller 165, the engine controller 170, the AVP interface controller 175, and the battery controller 150.

The high voltage power source 125 is a high voltage battery or high voltage generator in the host vehicle 100 that provides electrical energy to components of the host vehicle 100. The high voltage power source 125 powers the critical loads 140 and the non-critical loads under normal circumstances (e.g., when the critical loads 140 and high voltage power source 125 are working properly). The output of the high voltage power source 125 may be on the order of several hundred volts in some instances, such as when the high voltage power source 125 is used in an electric vehicle or a hybrid vehicle (i.e., a vehicle where propulsion can be powered by the high voltage power source 125, an internal combustion engine, or both). The output of the high voltage power source 125 may be in the form of direct current (DC).

The first voltage converter 130A and the second voltage converter 130B may be implemented via circuits, chips, or other electronic components that convert the output of the high voltage power source 125 to a different voltage. For instance, the first voltage converter 130A and the second voltage converter 130B may include circuits to reduce the DC output of the high voltage power source 125 to a lower DC output. Thus, the first voltage converter 130A and the second voltage converter 130B may be DC-to-DC converters. In one possible implementation, the output of the first voltage converter 130A and the output of the second voltage converter 130B may be on the order of 12 volts DC. The first voltage converter 130A and second voltage converter 130B may be electrically connected in parallel to the high voltage power source 125. The first voltage converter 130A and the second voltage converter 130B may be further arranged in parallel with various non-critical loads. For instance, the first voltage converter 130A may be electrically connected to a first non-critical load 180A and the second voltage converter 130B may be electrically connected to a second non-critical load 180B. The first non-critical load 180A and second non-critical load 180B may represent vehicle systems that draw electrical energy from the high voltage power source 125 but are not involved in the movement of the host vehicle 100 or passenger safety. Examples of non-critical loads may include the infotainment system, climate controls, door lock actuators, power windows, liftgate actuators, among others. The first voltage converter 130A and second voltage converter 130B are redundant to one another. Thus, the first voltage converter 130A may provide power to the second non-critical load 180B should the second voltage converter 130B fail. Likewise, the second voltage converter 130B may provide power to the first non-critical load 180A should the first voltage converter 130A fail. Further, although the singular form is used for purposes of clarity and convenience, the "first non-critical load 180A" may refer to a first group of non-critical loads and the "second non-critical load 180B" may refer to a second group of non-critical loads. One or more non-critical loads in the first group of non-critical loads may be the same as one or more non-critical loads in the second group of non-critical loads. In other words, there may be some overlap between the groups of non-critical loads.

The first backup battery 135A and second backup battery 135B are batteries of the host vehicle 100 that power the critical loads 140. The output of the first backup battery 135A and the second backup battery 135B may be a DC voltage lower than that of the high voltage power source 125. For instance, the output of the first backup battery 135A and the second backup battery 135B may be on the order of 12 volts DC. The first backup battery 135A may be electrically arranged in parallel relative to the first critical load 140A and the first non-critical load 180A. The second backup battery 135B may be electrically arranged in parallel relative to the second critical load 140B and the second non-critical load 180B. The critical loads 140 may refer to components of the host vehicle 100 that draw electrical energy and are involved in the movement of the host vehicle 100 or passenger safety. Examples of critical loads 140 may include actuators that control braking, steering, or acceleration of the host vehicle 100, actuators involved in the deployment of airbags and restraint devices, etc. The first backup battery 135A and second backup battery 135B may be redundant to one another. Thus, the first backup battery 135A may provide power to the second critical load 140B should the second backup battery 135B fail or be otherwise unavailable, as discussed below. Likewise, the second backup battery 135B may provide power to the first critical load 140A should the first backup battery 135A fail or be otherwise unavailable, as discussed below. Further, although the singular form is used for purposes of clarity and convenience, the "first critical load 140A" may refer to a first group of critical loads 140 and the "second critical load 140B" may refer to a second group of critical loads 140. One or more critical loads 140 in the first group of critical loads 140 may be the same as one or more critical loads 140 in the second group of critical loads 140. In other words, there may be some overlap between the groups of critical loads 140. Moreover, as shown in FIG. 2, the first backup battery 135A is electrically connected to the first voltage converter 130A. The second backup battery 135B is electrically connected to the second voltage converter 130B.

The first isolation circuit 145A and second isolation circuit 145B are each implemented via electronic components. The first isolation circuit 145A includes a first diode 185A arranged in the circuit 200 in parallel with a first switch 190A. An anode of the first diode 185A is electrically connected to the first non-critical load 180A and a cathode of the first diode 185A is electrically connected to the first backup battery 135A. The second isolation circuit 145B includes a second diode 185B arranged in the circuit 200 in parallel with a second switch 190B. An anode of the second diode 185B is electrically connected to the second non-critical load 180B and a cathode of the second diode 185B is electrically connected to the second backup battery 135B. In some instances, the first isolation circuit 145A and second isolation circuit 145B may be implemented via relays such as solid-state relays that, e.g., omit the first diode 185A and the second diode 185B, respectively. An example solid-state relay may include a field effect transistor (FET). The first switch 190A and the second switch 190B may be controlled by the processor 160 executing instructions stored in the memory 155. Thus, the output of the processor 160 may open or close the first switch 190A, the second switch 190B, or both. Referring to the first isolation circuit 145A, the first diode 185A prevents the first non-critical load 180A from drawing current from the first backup battery 135A. When the first switch 190A is open, current flow cannot bypass the first diode 185A. As a result, the first non-critical load 180A cannot draw current from the first backup battery 135A.

When the first switch 190A is closed, current flow bypasses the first diode 185A. As a result, the first non-critical load 180A can draw current from the first backup battery 135A. In other words, the first diode 185A electrically isolates the first backup battery 135A from the first non-critical load 180A when the first switch 190A is open. Referring now to the second isolation circuit 145B, the second diode 185B prevents the second non-critical load 180B from drawing current from the second backup battery 135B. When the second switch 190B is open, current flow cannot bypass the second diode 185B. As a result, the second non-critical load 180B cannot draw current from the second backup battery 135B. When the second switch 190B is closed, current flow bypasses the second diode 185B. As a result, the second non-critical load 180B can draw current from the second backup battery 135B. In other words, the second diode 185B electrically isolates the second backup battery 135B from the second non-critical load 180B when the second switch 190B is open.

The battery controller 150 is implemented via circuits, chips, or other electronic components that control various operations of the high voltage power source 125, the first backup battery 135A, the second backup battery 135B, the first voltage converter 130A, the second voltage converter 130B, and possibly other components of the power management system 115 such as the first switch 190A of the first isolation circuit 145A, the second switch 190B of the second isolation circuit 145B, etc. The powertrain controller 165 is implemented via circuits, chips, or other electronic components that control various powertrain components of the host vehicle 100. The engine controller 170 is implemented via circuits, chips, or other electronic components that control the internal combustion engine of the host vehicle 100. The AVP interface controller 175 is implemented via circuits, chips, or other electronic components that control various components of the host vehicle 100 that carry out autonomous vehicle operations. The AVP interface controller 175 may be programmed to interface with the virtual driver system 105, the components of the autonomous vehicle platform, etc.

The memory 155 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 155 may store instructions executable by the processor 160 and data. The instructions and data stored in the memory 155 may be accessible to the processor 160 and possibly other components of the power management system 115, the host vehicle 100, or both.

The processor 160 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 160 may be incorporated into any one or more of the first voltage converter 130A, the second voltage converter 130B, the battery controller 150, the powertrain controller 165, the engine controller 170, and the AVP interface controller 175. The processor 160 may be programmed to detect a short-circuit, excessive current draw from the non-critical loads, or both, and output control signals to open or close the first switch 190A, the second switch 190B, or both, as a result of detecting the short-circuit and/or the excessive current draw.

The processor 160 may be programmed to control the operation of the first switch 190A, the second switch 190B, or both, by outputting control signals that cause the first switch 190A, the second switch 190B, or both, to either open or close under various conditions. For example, the first switch 190A and the second switch 190B may be implemented via, e.g., a transistor or a relay that can be controlled by the signal output of the processor 160. In general, the processor 160 may be programmed to keep the first switch 190A, the second switch 190B, or both, closed when, e.g., the first voltage converter 130A, the second voltage converter 130B, or both, respectively, are working properly. The processor 160 may be programmed to open the first switch 190A, the second switch 190B, or both, when a failure causing a short-circuit is detected. Detecting the short-circuit may include detecting a failure of the first non-critical load 180A. In that instance, the processor 160 may be programmed to output the control signal to open the first switch 190A as a result of detecting the failure of the first non-critical load 180A. Likewise, detecting the short-circuit may include detecting a failure of the second non-critical load 180B. In that instance, the processor 160 may be programmed to output the control signal to open the second switch 190B as a result of detecting the failure of the second non-critical load 180B. The processor 160 may be further or alternatively programmed to open the first switch 190A, the second switch 190B, or both, as a result of detecting an excessive current draw by the first non-critical load 180A, the second non-critical load 180B, or both. Detecting the excessive current draw of the first non-critical load 180A or the second non-critical load 180B may include monitoring the current provided to the first non-critical load 180A and the second non-critical load 180B, respectively.

Alternatively or in addition, sometime the state of the first switch 190A, the second switch 190B, or both, may change in accordance with the voltage output of the high voltage power source 125, the first voltage converter 130A, the second voltage converter 130B, the first backup battery 135A, the second backup battery 135B, or a combination thereof. For example, in one possible approach, a high output voltage (e.g., a voltage on the order of 12 volts DC) of the first voltage converter 130A to the first isolation circuit 145A may cause the first switch 190A to close. A high output voltage of the second voltage converter 130B to the second isolation circuit 145B closes may cause the second switch 190B to close.

In some instances, a reduction of voltage at a circuit junction (e.g., a change in voltage from the sufficiently high output voltage to a much lower voltage, such as a voltage on the order of 0 volts DC) between the first voltage converter 130A and the first isolation circuit 145A may cause the first switch 190A to open. A voltage drop (i.e., a reduction of voltage at a circuit junction) between the second voltage converter 130B and the second isolation circuit 145B may cause the second switch 190B to open. Such voltage drops may be caused by a short-circuit in one the first non-critical load 180A or the second non-critical load 180B, respectively. The processor 160, as discussed above, may be programmed to detect short-circuits and output control signals to open or close the first switch 190A, the second switch 190B, or both, as a result of detecting the short-circuit. Alternatively or in addition, the state of the first switch 190A, the second switch 190B, or both, may be based on the output voltages of the first backup battery 135A, the second backup battery 135B, or both, relative to the output voltage of the high voltage power source 125, as discussed in greater detail below.

As shown in FIG. 2, the first voltage converter 130A is electrically connected to the second isolation circuit 145B and the second voltage converter 130B is electrically connected to the first isolation circuit 145A. In that instance, a high output voltage of the second voltage converter 130B relative to the first isolation circuit 145A may close the first switch 190A. Further, a high output voltage of the first voltage converter 130A to the second isolation circuit 145B may close the second switch 190B. A voltage drop between the second voltage converter 130B and the first isolation circuit 145A may open the first switch 190A. A voltage drop between the first voltage converter 130A and the second isolation circuit 145B may open the second switch 190B.

In another possible implementation, the second backup battery 135B is electrically connected to the first isolation circuit 145A and the first backup battery 135A is electrically connected to the second isolation circuit 145B. In that implementation, the voltage output of the second backup battery 135B may control the state of the first switch 190A and the voltage output of the first backup battery 135A may control the state of the second switch 190B. For example, a high output voltage of the second backup battery 135B may cause the first switch 190A to close, especially if the output voltage of the second backup battery 135B can power the second critical load 140B. Closing the first switch 190A may allow the first backup battery 135A to power the first non-critical load 180A. Alternatively, a high output voltage of the first backup battery 135A may cause the second switch 190B to close, especially if the output voltage of the first backup battery 135A can power the first critical load 140A. Closing the second switch 190B may allow the second backup battery 135B to power the second non-critical load 180B.

The first backup battery 135A may also be able to control the state of the first switch 190A. That is, the first switch 190A may open as a result of the output voltage of the first backup battery 135A exceeding the output voltage of the first voltage converter 130A provided to the first isolation circuit 145A. The first switch 190A may be closed while the output voltage of the first backup battery 135A to the first isolation circuit 145A is below the output voltage of the first voltage converter 130A to the first isolation circuit 145A. Likewise, the second backup battery 135B may be able to control the state of the second switch 190B. That is, the second switch 190B may open as a result of the output voltage of the second backup battery 135B exceeding the output voltage of the second voltage converter 130B provided to the second isolation circuit 145B. The second switch 190B may be closed while the output voltage of the second backup battery 135B to the second isolation circuit 145B is below the output voltage of the second voltage converter 130B to the second isolation circuit 145B.

Figure 3:
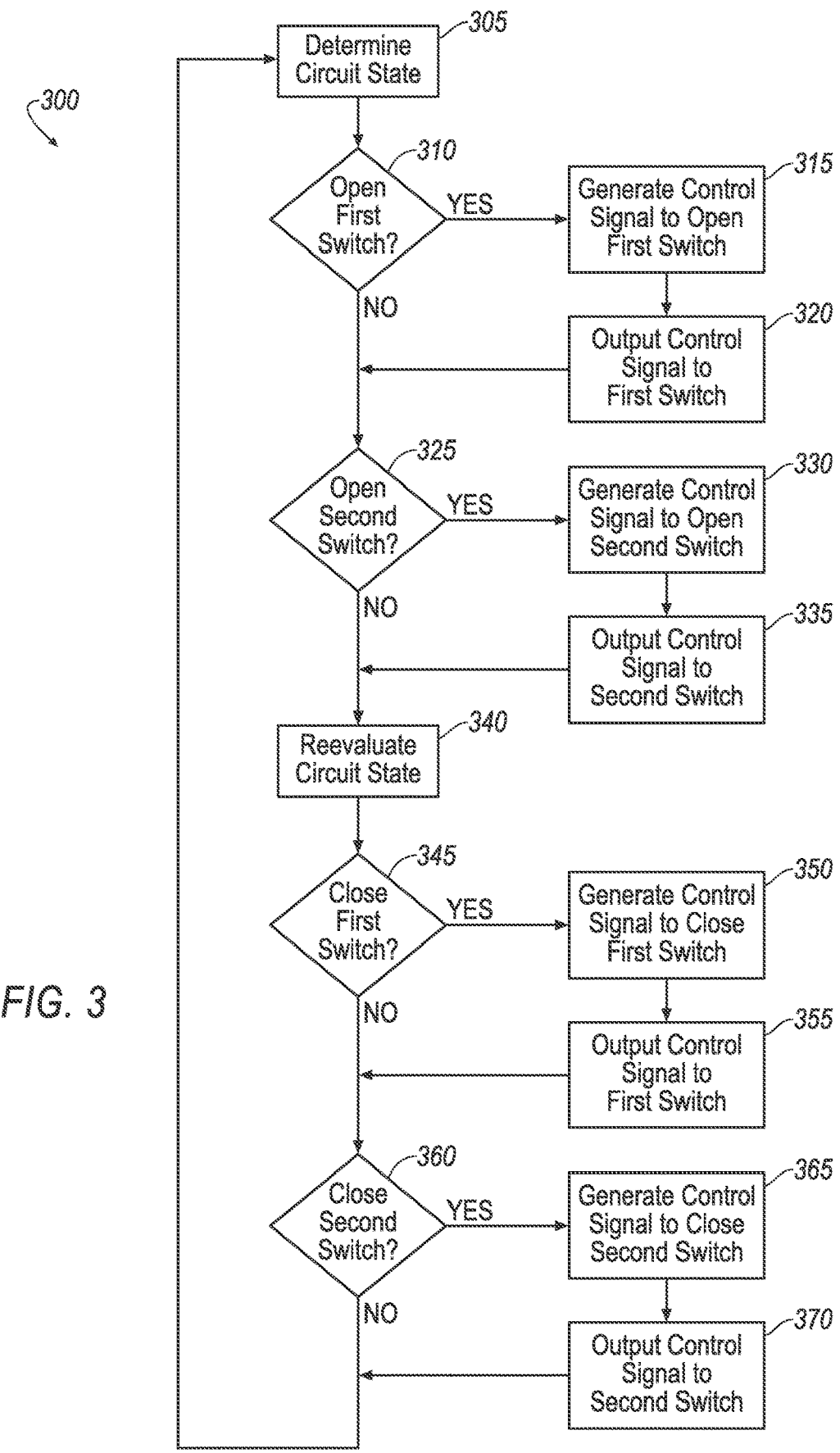
FIG. 3 is a flowchart of an example process that may be executed by the power management system.

FIG. 3 is a flowchart of an example process 300 that may be implemented by one or more components of the power management system 115 to manipulate the state of the first switch 190A, the second switch 190B, or both under various circumstances. The process 300 may begin at any time while, e.g., the host vehicle 100 is operating. The process 300 may continue to execute until, e.g., the host vehicle 100 is no longer in use. The process 300 is just one way to manipulate the states of the first switch 190A and the second switch 190B. For example, rather than perform the process 300, the states of the first switch 190A and second switch 190B may change in accordance with the output voltage of one component of the power management system 115 relative to another component of the power management system 115. That is, as previously explained, the states of the first switch 190A, the second switch 190B, or both, may change based on the output voltage of one of the following devices relative to the output voltage of another of the following devices: the high voltage power source 125, the first voltage converter 130A, the first backup battery 135A, the second voltage converter 130B, and the second backup battery 135B.

At block 305, the power management system 115 determines a circuit state. The circuit state may include data representing whether any short-circuits caused by failures of the first voltage converter 130A, the second voltage converter 130B, the first non-critical load 180A, the second non-critical load 180B, etc., have been detected in the circuit 200. The circuit state may also or alternatively indicate an excessive current draw by the first non-critical load 180A, the second non-critical load 180B, or both. The processor 160 may determine the circuit state by monitoring the output voltages of the any one or more of the high voltage power source 125, the first voltage converter 130A, the first backup battery 135A, the second voltage converter 130B, and the second backup battery 135B or the current provided to the first non-critical load 180A and the second non-critical load 180B. The processor 160 may further or alternatively determine the circuit state by monitoring the voltage across the first non-critical load 180A and the second non-critical load 180B. Examples of circuit states may include, e.g., normal operation of the circuit 200, a short-circuit across the first non-critical load 180A, excessive current draw by the first non-critical load 180A, a short-circuit across the second non-critical load 180B, excessive current draw by the second non-critical load 180B, a failure of the first voltage converter 130A, a failure of the second voltage converter 130B, a state of the first backup battery 135A (e.g., whether the first backup battery 135A can power the first critical load 140A, the first non-critical load 180A, both, or neither), a state of the second backup battery 135B (e.g., whether the second backup battery 135B can power the second critical load 140B, the second non-critical load 180B, both, or neither), or the like.

At decision block 310, the power management system 115 determines whether to open the first switch 190A. Since normal operation of the circuit 200 shown in FIG. 2 would have the first switch 190A closed, the processor 160 determines at block 310 if the circuit state indicates a reason to open the first switch 190A. Examples of reasons to open the first switch 190A may include detecting a short-circuit across the first non-critical load 180A, excessive current draw by the first non-critical load 180A, a short-circuit across the second non-critical load 180B, excessive current draw across the second non-critical load 180B, a failure of the first voltage converter 130A, or a failure of the second voltage converter 130B. Opening the first switch 190A in those instances will isolate the first backup battery 135A from the failed component of the circuit 200, thereby prevent the short-circuit or excessive current draw from draining the first backup battery 135A. As a result, the output voltage of the first back-up battery will be available to power the first critical load 140A. Not all short-circuits or excessive current draws may warrant isolating the first back-up battery by opening the first switch 190A, however. Examples of reasons to keep the first switch 190A closed despite detecting a short-circuit or excessive current draw may include determining that the first back-up battery can power the first critical load 140A and at least one of the first non-critical load 180A and the second non-critical load 180B. If the processor 160 determines to open the first switch 190A, the process 300 may proceed to block 315. If the processor 160 decides that the first switch 190A should remain closed, the process 300 may proceed to block 325.

At block 315, the power management system 115 generates a control signal for the first switch 190A to open. The processor 160 may be programmed to generate the control signal commanding the first switch 190A to open.

At block 320, the power management system 115 outputs the control signal generated at block 315 to the first switch 190A. The processor 160 may be programmed to output the control signal to the first switch 190A, and the first switch 190A may open as a result of receiving the control signal.

At decision block 325, the power management system 115 determines whether to open the second switch 190B. Since normal operation of the circuit 200 shown in FIG. 2 would have the second switch 190B closed, the processor 160 determines at block 325 if the circuit state indicates a reason to open the second switch 190B. Examples of reasons to open the second switch 190B may include detecting a short-circuit across the first non-critical load 180A, excessive current draw by the first non-critical load 180A, a short-circuit across the second non-critical load 180B, excessive current draw across the second non-critical load 180B, a failure of the first voltage converter 130A, or a failure of the second voltage converter 130B. Opening the second switch 190B in those instances will isolate the second backup battery 135B from the failed component of the circuit 200, thereby prevent the short-circuit or excessive current draw from draining the second backup battery 135B. As a result, the output voltage of the second back-up battery will be available to power the second critical load 140B. Not all short circuits or excessive current draws may warrant isolating the second back-up battery by opening the second switch 190B, however. Examples of reasons to keep the second switch 190B closed despite detecting a short-circuit or excessive current draw may include determining that the second back-up battery can power the second critical load 140B and at least one of the first non-critical load 180A and the second non-critical load 180B. If the processor 160 determines to open the second switch 190B, the process 300 may proceed to block 330. If the processor 160 decides that the second switch 190B should remain closed, the process 300 may proceed to block 340.

At block 330, the power management system 115 generates a control signal for the second switch 190B to open. The processor 160 may be programmed to generate the control signal commanding the second switch 190B to open.

At block 335, the power management system 115 outputs the control signal generated at block 330 to the second switch 190B. The processor 160 may be programmed to output the control signal to the second switch 190B, and the second switch 190B may open as a result of receiving the control signal.

At block 340, the power management system 115 reevaluates the circuit state. For instance, the processor 160 may reevaluate whether the circuit state has changed since block 305 since the new circuit state could warrant changing the state of the first switch 190A, the second switch 190B, or both. The process 300 may proceed to block 345 after the circuit state has been reevaluated.

At decision block 345, the power management system 115 determines whether to close the first switch 190A. Since normal operation of the circuit 200 shown in FIG. 2 would have the first switch 190A closed, the processor 160 determines at block 345 if the circuit state indicates a reason to close the first switch 190A based on the circuit state determined at block 340. Examples of reasons to close the first switch 190A may include determining that the first switch 190A was opened based on the circuit state at block 305 but that the circuit state has changed in a way that there is no longer a short-circuit across the first non-critical load 180A, excessive current draw by the first non-critical load 180A, a short-circuit across the second non-critical load 180B, excessive current draw across the second non-critical load 180B, a failure of the first voltage converter 130A, or a failure of the second voltage converter 130B. In other words, the processor 160 may decide to close the first switch 190A if the first backup battery 135A no longer needs to be isolated from the first non-critical load 180A. If the processor 160 decides to close the first switch 190A, the process 300 may proceed to block 350. If the processor 160 decides that the first switch 190A should remain open or that the state of the first switch 190A should not change (which may occur if the first switch 190A was not opened as a result of block 310), the process 300 may proceed to block 360.

At block 350, the power management system 115 generates a control signal for the first switch 190A to close. The processor 160 may be programmed to generate the control signal commanding the first switch 190A to close.

At block 355, the power management system 115 outputs the control signal generated at block 350 to the first switch 190A. The processor 160 may be programmed to output the control signal to the first switch 190A, and the first switch 190A may close as a result of receiving the control signal.

At decision block 360, the power management system 115 determines whether to close the second switch 190B. Since normal operation of the circuit 200 shown in FIG. 2 would have the second switch 190B closed, the processor 160 determines at block 360 if the circuit state indicates a reason to close the second switch 190B based on the circuit state determined at block 340. Examples of reasons to close the second switch 190B may include determining that the second switch 190B was opened based on the circuit state at block 305 but that the circuit state has changed in a way that there is no longer a short-circuit across the first non-critical load 180A, excessive current draw by the first non-critical load 180A, a short-circuit across the second non-critical load 180B, excessive current draw across the second non-critical load 180B, a failure of the first voltage converter 130A, or a failure of the second voltage converter 130B. In other words, the processor 160 may decide to close the second switch 190B if the second backup battery 135B no longer needs to be isolated from the second non-critical load 180B. If the processor 160 decides to close the second switch 190B, the process 300 may proceed to block 365. If the processor 160 decides that the second switch 190B should remain open or that the state of the second switch 190B should not change (which may occur if the second switch 190B was not opened as a result of block 310), the process 300 may return to block 305.

At block 365, the power management system 115 generates a control signal for the second switch 190B to close. The processor 160 may be programmed to generate the control signal commanding the second switch 190B to close.

At block 370, the power management system 115 outputs the control signal generated at block 365 to the second switch 190B. The processor 160 may be programmed to output the control signal to the second switch 190B, and the second switch 190B may close as a result of receiving the control signal.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle power management system comprising:
a first backup battery;

a first isolation circuit having a first switch in parallel with a first diode, wherein the first isolation circuit is electrically connected to the first backup battery to electrically isolate the first backup battery from a first non-critical load when the first switch is open;

a second backup battery;

a second isolation circuit having a second switch in parallel with a second diode to electrically isolate the second backup battery from a second non-critical load, wherein the second isolation circuit is electrically connected to the second backup battery to electrically isolate the second backup battery from the second non-critical load when the second switch is open;

a first voltage converter electrically connected to the first non-critical load, the first isolation circuit, and the first backup battery; and a second voltage converter electrically connected to the second non-critical load, the second isolation circuit, and the second backup battery, wherein a high output voltage of the first voltage converter to the first isolation circuit causes the first switch of the first isolation circuit to close, wherein an anode of the first diode is electrically connected to the first non-critical load and a cathode of the first diode is electrically connected to the first backup battery, wherein a high output voltage of the second voltage converter to the second isolation circuit causes the second switch of the second isolation circuit to close.

2. The vehicle power management system of claim 1, wherein a reduction of voltage at a circuit junction between the first voltage converter and the first isolation circuit causes the first switch of the first isolation circuit to open and wherein a reduction of voltage at a circuit junction between the second voltage converter and the second isolation circuit causes the second switch of the second isolation circuit to open.

3. The vehicle power management system of claim 1, wherein the first voltage converter is electrically connected to the second isolation circuit and the second voltage converter is electrically connected to the first isolation circuit, wherein a high output voltage of the second voltage converter to the first isolation circuit causes the first switch of the first isolation circuit to close, and wherein a high output voltage of the first voltage converter to the second isolation circuit causes the second switch of the second isolation circuit to close.

4. The vehicle power management system of claim 3, wherein a reduction of voltage at a circuit junction between the second voltage converter and the first isolation circuit opens the first switch of the first isolation circuit and wherein a reduction of voltage at a circuit junction between the first voltage converter and the second isolation circuit opens the second switch of the second isolation circuit.

5. The vehicle power management system of claim 1, wherein the second backup battery is electrically connected to the first isolation circuit and wherein the first backup battery is electrically connected to the second isolation circuit.

6. The vehicle power management system of claim 1, further comprising a high voltage power source electrically connected through at least one of the first voltage converter or the second voltage converter to the first isolation circuit, the first backup battery, the second isolation circuit, and the second backup battery.

7. The vehicle power management system of claim 6, wherein the first switch of the first isolation circuit opens as a result of an output voltage of the first backup battery to the first isolation circuit exceeding an output voltage of the voltage converter to the first isolation circuit.

8. The vehicle power management system of claim 7, wherein the second switch of the second isolation circuit opens as a result of an output voltage of the second backup battery to the second isolation circuit exceeding an output voltage of the voltage converter to the second isolation circuit.

9. The vehicle power management system of claim 6, wherein the first switch of the first isolation circuit is closed while an output voltage of the first backup battery to the first isolation circuit is below an output voltage of the voltage converter to the first isolation circuit.

10. The vehicle power management system of claim 9, wherein the second switch of the second isolation circuit is closed while an output voltage of the second backup battery to the second isolation circuit is below an output voltage of the voltage converter to the second isolation circuit.

11. The vehicle power management system of claim 1, further comprising a memory and a processor programmed to execute instructions stored in the memory, wherein the instructions include detecting a short-circuit and outputting a control signal to open at least one of the first switch and the second switch as a result of detecting the short-circuit.

12. The vehicle power management system of claim 11, wherein detecting the short-circuit includes detecting a failure of the first non-critical load and wherein outputting the control signal includes outputting the control signal to open the first switch as a result of detecting the failure of the first non-critical load.

13. The vehicle power management system of claim 12, wherein detecting the short-circuit includes detecting a failure of the second non-critical load and wherein outputting the control signal includes outputting the control signal to open the second switch as a result of detecting the failure of the second non-critical load.

14. A vehicle power management system comprising:

a first backup battery;

a first isolation circuit having a first switch in parallel with a first diode, wherein the first isolation circuit is electrically connected to the first backup battery to electrically isolate the first backup battery from a first non-critical load when the first switch is open;

a second backup battery;

a second isolation circuit having a second switch in parallel with a second diode to electrically isolate the second backup battery from a second non-critical load, wherein the second isolation circuit is electrically connected to the second backup battery to electrically isolate the second backup battery from a second non-critical load when the second switch is open;

a first voltage converter electrically connected to the first non-critical load, the first isolation circuit, the first backup battery, the second non-critical load, the second isolation circuit, and the second backup battery;

a second voltage converter electrically connected to the first non-critical load, the first isolation circuit, the first backup battery, the second non-critical load, the second isolation circuit, and the second backup battery;

a memory; and a processor programmed to execute instructions stored in the memory, wherein the instructions include detecting a short-circuit and outputting a control signal to open at least one of the first switch and the second switch as a result of detecting the short-circuit, wherein a reduction of voltage at a circuit junction between the first voltage converter and the first isolation circuit opens the first switch of the first isolation circuit and wherein a reduction of voltage at a circuit junction between the second voltage converter and the second isolation circuit opens the second switch of the second isolation circuit.

15. A vehicle power management system comprising:
a first backup battery;
a first isolation circuit having a first switch in parallel with a first diode, wherein the first isolation circuit is electrically connected to the first backup battery to electrically isolate the first backup battery from a first non-critical load when the first switch is open;
a second backup battery;
a second isolation circuit having a second switch in parallel with a second diode to electrically isolate the second backup battery from a second non-critical load, wherein the second isolation circuit is electrically connected to the second backup battery to electrically isolate the second backup battery from a second non-critical load when the second switch is open;
a first voltage converter electrically connected to the first non-critical load, the first isolation circuit, the first backup battery, the second non-critical load, the second isolation circuit, and the second backup battery;
a second voltage converter electrically connected to the first non-critical load, the first isolation circuit, the first backup battery, the second non-critical load, the second isolation circuit, and the second backup battery;
a memory; and
a processor programmed to execute instructions stored in the memory, wherein the instructions include detecting a short-circuit and outputting a control signal to open at least one of the first switch and the second switch as a result of detecting the short-circuit,
wherein a reduction of voltage at a circuit junction between the second voltage converter and the first isolation circuit opens the first switch of the first isolation circuit and wherein a reduction of voltage at a circuit junction between the first voltage converter and the second isolation circuit opens the second switch of the second isolation circuit.

* * * * *